(12) United States Patent
Kumazaki et al.

(10) Patent No.: US 7,227,446 B2
(45) Date of Patent: Jun. 5, 2007

(54) ELECTRONIC KEY SYSTEM FOR ENTRY OBJECTS

(75) Inventors: Takeshi Kumazaki, Okazaki (JP); Ifushi Shimonomoto, Okazaki (JP)

(73) Assignee: Denso Corporation, Kariya (JP)

( * ) Notice: Subject to any disclaimer, the term of this patent is extended or adjusted under 35 U.S.C. 154(b) by 315 days.

(21) Appl. No.: 10/901,069

(22) Filed: Jul. 29, 2004

(65) Prior Publication Data

US 2005/0052276 A1   Mar. 10, 2005

(30) Foreign Application Priority Data

Sep. 5, 2003   (JP) .............................. 2003-314361

(51) Int. Cl.
  G05B 19/00 (2006.01)
  G06F 7/00 (2006.01)
  G06K 19/00 (2006.01)
  G08B 29/00 (2006.01)
  H04B 1/00 (2006.01)

(52) U.S. Cl. ..................... 340/5.61; 340/5.6; 340/5.64; 340/5.72

(58) Field of Classification Search ............... 340/5.61, 340/5.6, 5.64, 5.72, 5.73, 10.5, 426, 539; 123/179.2, 179.3; 307/10.2–10.3; 341/176
See application file for complete search history.

(56) References Cited

U.S. PATENT DOCUMENTS

| | | | |
|---|---|---|---|
| 5,561,331 A * | 10/1996 | Suyama et al. ............ 307/10.3 |
| 5,912,512 A * | 6/1999 | Hayashi et al. ............ 307/10.5 |
| 5,949,152 A | 9/1999 | Tagawa et al. |
| 6,160,488 A * | 12/2000 | Honda ........................ 340/5.65 |
| 6,259,168 B1 * | 7/2001 | Okada ........................ 307/10.5 |
| 6,400,254 B2 * | 6/2002 | Yamamoto et al. .......... 340/5.6 |
| 6,414,586 B1 * | 7/2002 | Yoshizawa ................. 340/5.2 |
| 6,501,369 B1 * | 12/2002 | Treharne ................... 340/5.22 |
| 6,518,882 B2 * | 2/2003 | Johnson et al. .......... 340/539.1 |
| 6,876,292 B2 * | 4/2005 | Onuma et al. ............. 340/5.62 |

FOREIGN PATENT DOCUMENTS

| | | |
|---|---|---|
| JP | A-7-82936 | 3/1995 |
| JP | A-2000-64680 | 2/2000 |
| JP | A-2002-322841 | 11/2002 |
| WO | WO 01/25572 | 4/2001 |

* cited by examiner

*Primary Examiner*—Brian Zimmerman
*Assistant Examiner*—Nam Nguyen
(74) *Attorney, Agent, or Firm*—Posz Law Group, PLC

(57) ABSTRACT

An electronic key system for an entry object such as a vehicle is comprised of a portable device and an in-object device. The portable device has a device body and an emergency key detachably accommodated in the device body. The emergency key has a transponder, which is separate from a transponder provided in the device body. The transponder is for verifying the authority of registration of an additional portable device, while the transponder is for verifying the authority of vehicle control. The device body is also capable of detachably accommodating an emergency key which has no transponder.

7 Claims, 3 Drawing Sheets

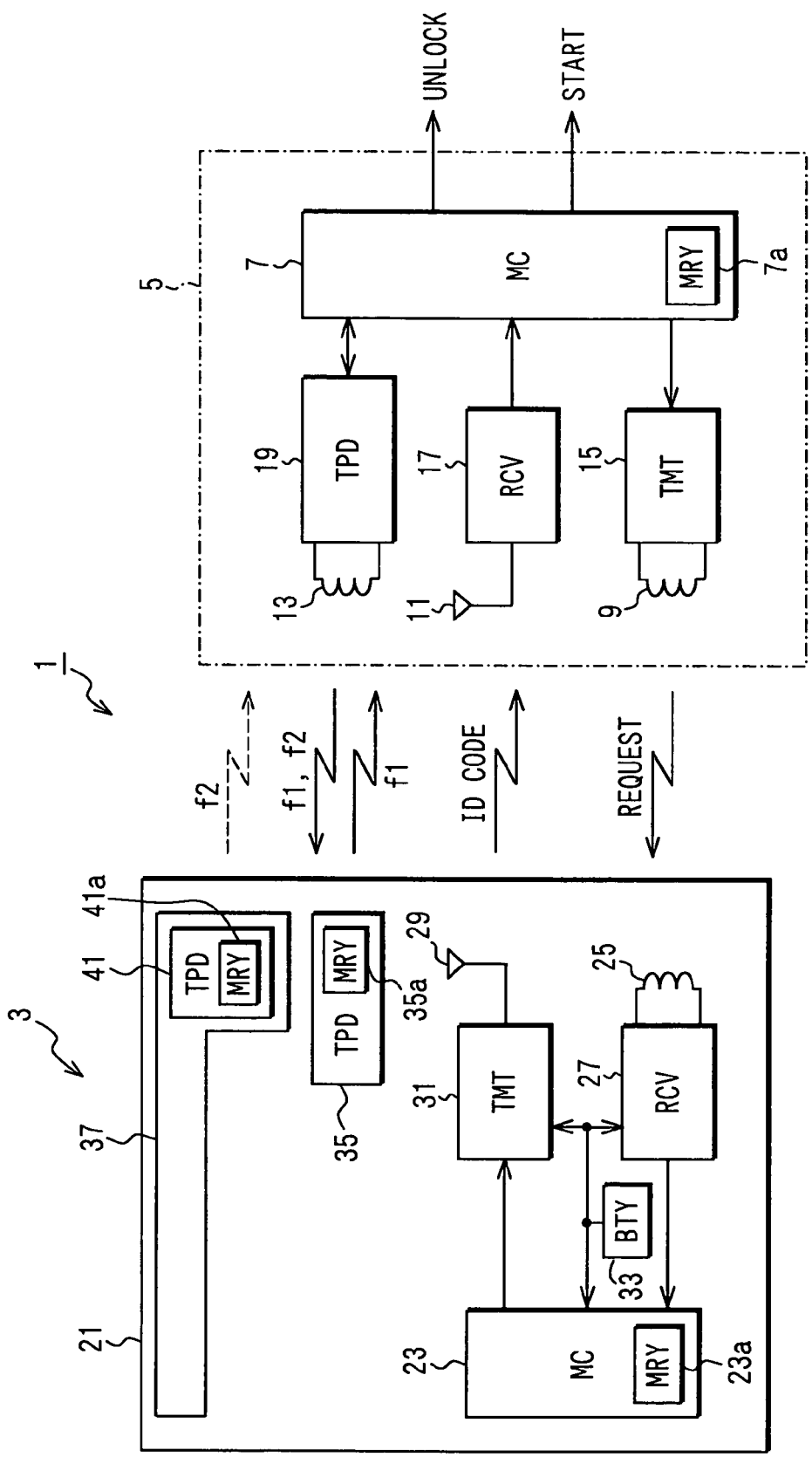

ELECTRONIC KEY SYSTEM FOR ENTRY OBJECTS

CROSS REFERENCE TO RELATED APPLICATION

This application is based on and incorporates herein by reference Japanese Patent Application No. 2003-314361 filed on Sep. 5, 2003.

FIELD OF THE INVENTION

The present invention relates to an electronic key system for entry objects such as vehicles or buildings.

BACKGROUND OF THE INVENTION

In a conventional electronic key system for vehicles, an electronically operable hand-held device (portable device) carried by a vehicle user transmits its identification information (ID code) in response to a request transmitted from an electronically operable in-vehicle device mounted in a vehicle. The in-vehicle device compares the ID code received from the portable device and an ID code stored in its memory. The in-vehicle device permits predetermined operations, such as locking or unlocking of doors or starting of an engine of a vehicle, if the compared ID codes agree.

JP 2002-322841 proposes that a portable device detachably accommodates therein a mechanical key (key plate) as an emergency key for use in case of inoperability of the portable device because of battery rundown. JP 2000-64680 proposes that an in-vehicle device allows registration of additional portable devices by storing each ID code of such additional portable devices.

It is necessary that the in-vehicle device confirms that the registration of each additional portable device is requested by an authorized user from the standpoint of security. The in-vehicle device may use, as a key registration verification ID code, the same ID code as assigned to the original portable device for the normal door lock/unlock control or engine operation to confirm that the registration of the additional portable device is requested by the authorized user.

In this case, vehicle security may not be ensured. For instance, if a driver who rents a vehicle successfully registers an additional portable device without authorization, the driver can steal the vehicle by the additional portable device even after the vehicle is returned.

To overcome this problem, the key registration verification ID code may be stored in a different body such as a card, which is separate from the portable device and not normally carried. The different body however is sometimes inconvenient. For instance, it is likely to be lost or unavailable at the time of requesting the additional registration, because it is not usually carried.

SUMMARY OF THE INVENTION

It is therefore an object of the present invention to provide an electronic key system for entry objects such as vehicles or buildings, which provides both security and convenience.

According to the present invention, an electronic key system for entry objects such as a vehicle is comprised of a portable device and an in-object device, which perform radio communication each other. The portable device has a body including a memory storing first identification information thereof, and a first communication device for transmitting the first identification information to the in-object device. The portable device also has an emergency key detachably integrated with the body and operable mechanically. The emergency key has a memory storing second identification information as registration information which is transmitted to the in-object device to indicate an authorized user at the time of registering an additional portable device.

The in-object device is for performing a predetermined operation when the first identification information transmitted from the portable device is identical with registered identification information stored therein. The in-vehicle device transmits the first request to the portable device so that only the first communication device responds when determining whether the predetermined operation should be performed, and transmits the second request to the portable device so that only the second communication device responds when determining whether a registration of identification information should be performed.

BRIEF DESCRIPTION OF THE DRAWINGS

The above and other objects, features and advantages of the present invention will become more apparent from the following detailed description made with reference to the accompanying drawings. In the drawings:

FIG. 1 is a block diagram showing an electronic key system according to an embodiment of the present invention;

DETAILED DESCRIPTION OF THE PREFERRED EMBODIMENT

Figure 2A:
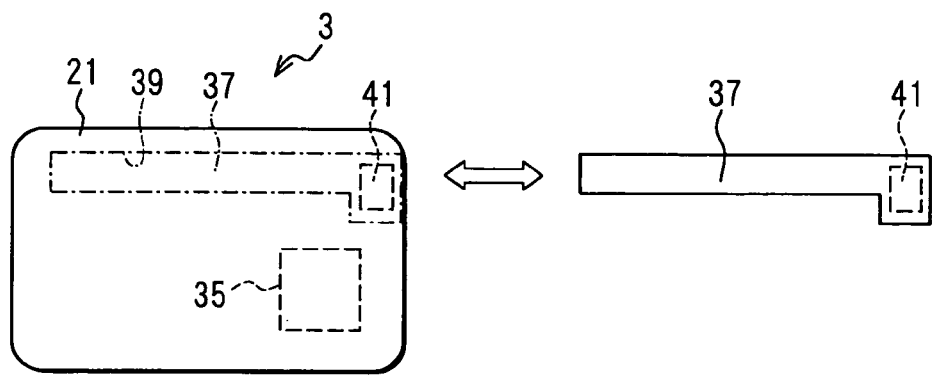
FIGS. 2A to 2C are schematic views showing a portable device used in the embodiment.

Referring first to FIG. 1, an electronic key system 1 for vehicles is comprised of an electronically operable portable device 3 hand-held by an authorized user such as a vehicle owner, and an electronically operable in-vehicle device 5 mounted in a vehicle. In this system 1, the portable device 3 and the in-vehicle device 5 perform radio communication so that the in-vehicle device 5 may check if the portable device 3 is an authorized one, that is, same ID code as stored, and execute a vehicle door lock/unlock control or an engine start control.

The in-vehicle device 5 has a microcomputer 7, a transmitter antenna 9, a receiver antenna 11 and a transponder antenna 13, a transmitter circuit (TMT) 15, a receiver circuit (RCV) 17 and a transponder circuit (TPD) 19. The microcomputer 7 has a nonvolatile memory 7a, which stores various ID codes specific to each vehicle.

The transmitter antenna 9 is a coil type for transmitting an electromagnetic wave (request wave) in a predetermined first area outside a vehicle. The receiver antenna 11 is for receiving an electromagnetic wave (ID code wave) indicative of identification information transmitted from the portable device 3 in response to the request wave. The transponder antenna 13 is a coil type for generating an electromagnetic field (EM field) for an electromagnetic induction type radio communication in a predetermined second area inside the vehicle and receiving an electromagnetic wave as a transponder wave transmitted from the portable device 3 in response to the in-vehicle electromagnetic field. Specifically, the transponder antenna 13 is for generating electromagnetic fields of two frequencies f1 and f2 as a first and a second requests from the in-vehicle device 5 and receiving transponder waves of the same frequencies f1 and f2. The second area is defined to be much narrower than the first area, and is preferably about 60 to 70 cm around a starting button provided in the vehicle for starting an engine.

The transmitter circuit 15 is for modulating a carrier wave with a request signal applied from the microcomputer 7 to generate the request wave including the request signal, which is transmitted from the transmitter antenna 9. The receiver circuit 17 is for demodulating the ID code wave received by the receiver antenna 11 to apply an ID code included in the ID code wave to the microcomputer 7. The transponder circuit 19 is for causing the transponder antenna 13 to generate the electromagnetic field of either frequency f1 or f2 determined by the microcomputer 7 and for demodulating the transponder wave received by the transponder antenna 13 to apply the ID code included in the transponder wave to the microcomputer 7.

The portable device 3 has, in a hand-held device body 21 made of resin, a microcomputer 23, a receiver antenna 25, a receiver circuit 27, a transmitter antenna 29, a transmitter circuit 31 and a built-in storage battery 33. The receiver antenna 25 is a coil type for receiving the request wave transmitted from the coil 9. The receiver circuit 27 is for demodulating the request signal to apply the request signal included in the request wave to the microcomputer 23. The transmitter circuit 31 is for modulating a carrier wave with an ID code signal applied from the microcomputer 23 and causing the transmitter antenna 29 to transmit the ID code wave including the ID code signal. The battery 33 is for supplying electric power to the circuits 23, 27 and 31.

The ID code, which the microcomputer 23 supplies to the transmitter circuit 31, is specific to this portable device 3 and for use in verifying authority of door lock/unlock operation. This ID code is stored in a non-volatile memory 23a of the microcomputer 23.

The portable device 3 further has, in its device body 21, a first transponder 35, which receives the transponder wave of the first frequency f1 generated by the transponder coil 13 and operates with electric power of this transponder wave. The transponder 35 is for transmitting an electromagnetic wave as a transponder wave including an ID code stored in a non-volatile memory 35a, when operated with the electromagnetic field of the first frequency f1.

As shown in FIG. 1, the device body 21 is shaped to have an accommodation hole or slot 39 for detachably accommodating a mechanical stick-like emergency key 37 therein. The emergency key 37 is thus normally inserted in or integrated with the device body 21. The emergency key 37 may be detached from the device body 21 and used to mechanically lock or unlock vehicle doors, trunks and other parts, when the battery 33 runs down for instance. The portable device 3 cannot be used as an electronic key, because the transmitter antenna 29 will not transmit the transponder wave because of insufficient electric power from the battery 33.

The emergency key 37 has therein a second transponder 41, which receives the transponder wave of the second frequency f2 generated by the transponder coil 13 and operates with electric power of this transponder wave. The transponder 41 is for transmitting an electromagnetic wave as a transponder wave including an ID code stored in a non-volatile memory 41a, when operated with the electromagnetic field of the second frequency f2. The transponder 41 and also transponder 35 are used because transponders do not need respective built-in batteries.

The ID codes stored in the memories 35a and 41a are also specific to the portable device 3 as the ID code stored in the memory 23a is. The ID codes are however different from each other. Specifically, the ID code stored in the memory 35a and transmitted from the transponder 35 is for use in verifying authority of engine starting control, and the ID code stored in the memory 41a and transmitted from the transponder 41 is a key registration verification ID code, which is for use in verifying authority of registering an additional portable device.

The portable device 3 also has an additional emergency key 37', which may be detachably inserted into the slot 39 to be integrated with the device body 21 as shown in FIG. 37'. This additional key 37' is similar to the key 37 in structure and function, but has no transponder therein. It is assumed in this embodiment that the emergency key 37 having the transponder 41 is normally accommodated in the slot 39 of the portable device 3.

The electronic key system operates as follows for unlocking vehicle doors, which are in the locked condition. It is assumed that the battery 33 of the portable device 3 has sufficient power.

The in-vehicle device 5 transmits the request wave from the transmitter antenna 9 at a predetermined interval toward the first area outside the vehicle. When a vehicle user or driver carrying the portable device 3 enters the first area, the portable device 3 receives the request wave by the antenna 25. The receiver circuit 27 demodulates the request wave and outputs the request signal to the microcomputer 23. The microcomputer 23 outputs the ID code stored in the memory 23a to the transmitter circuit 31 in response to the request signal. The transmitter circuit 31 responsively activates the transmitter antenna 29 to transmit the ID code wave including the ID code specific to the portable device 3.

The in-vehicle device 5 receives the ID code wave by the receiver antenna 11. The receiver circuit 17 demodulates the ID code wave and outputs the ID code to the microcomputer 7. The microcomputer 7 compares this ID code with the door lock/unlock verification ID code stored in the nonvolatile memory 7a. If both ID codes agree, the microcomputer 7 outputs a door unlock permission signal to a doorlock/unlock control device (not shown). The vehicle doors will be automatically unlocked when the vehicle user arrives at the vehicle within a predetermined time and touches a door handle or the like.

In the case that the battery 33 of the portable device 3 does not have sufficient power, the portable device 3 cannot transmit the ID code wave from the transmitter antenna 29. As a result, the vehicle doors will not be automatically unlocked event when the vehicle user touches the vehicle door. The vehicle user, however, may detach the emergency key 37 from the device body 21 of the portable device 3 and manually unlock the door by inserting the emergency key 37 into a key cylinder of the door in the conventional manner.

Figure 3:
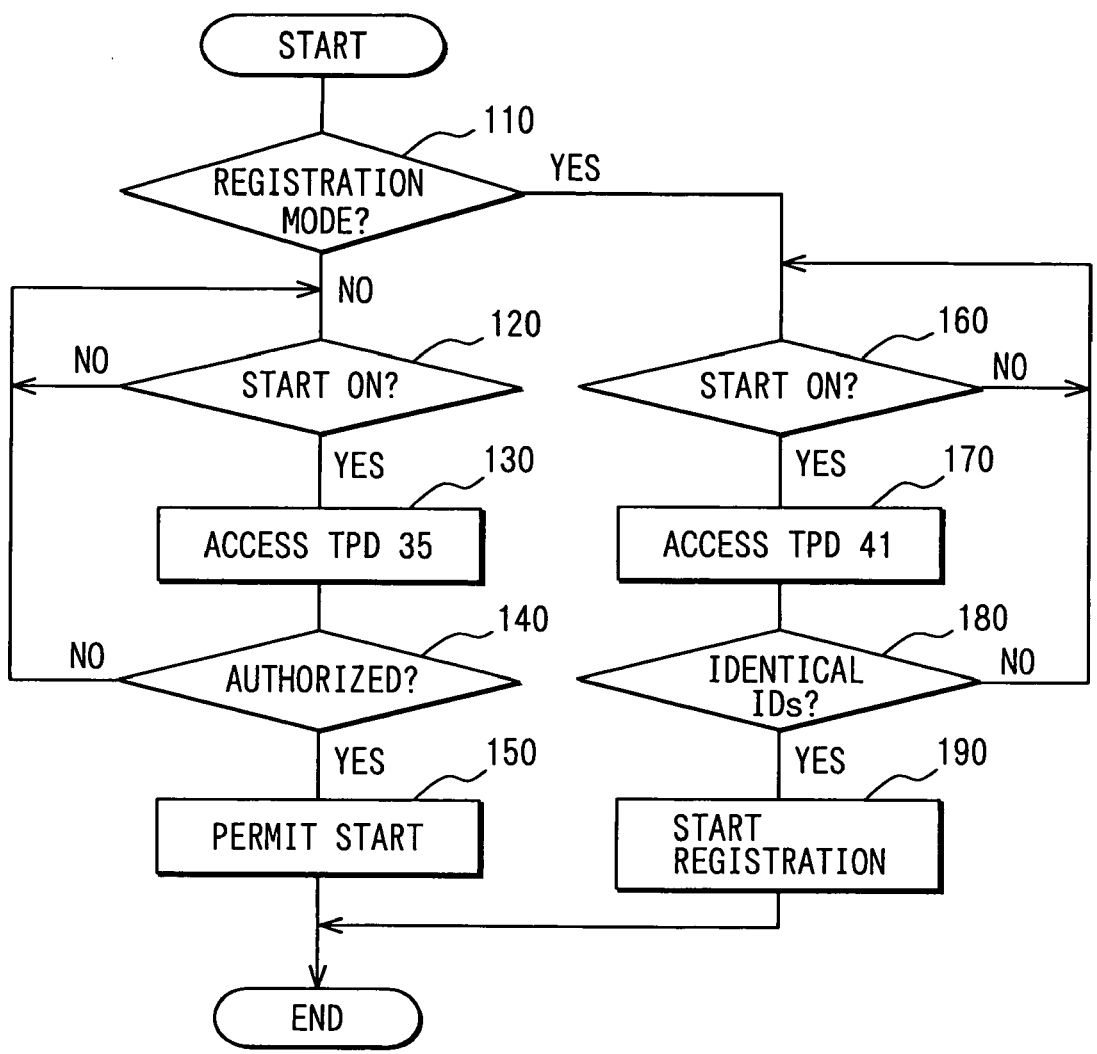
FIG. 3 is a flow chart showing an operation process executed by an in-vehicle device in the embodiment.

When the vehicle user enters the vehicle, the electronic key system 1 operates as follows. Specifically, the microcomputer 7 of the in-vehicle device 5 performs the processing shown in FIG. 3, under the condition that a vehicle engine is at rest.

The microcomputer 7 checks at step 110 to which the processing should proceed, that is, whether a normal mode or a registration mode should be performed. In the registration mode, an additional ID code for door lock/unlock verification and for engine starting verification are stored in the memory 7a. This determination may be made based on whether a registration instruction mode instruction signal is applied to the microcomputer 7 from an external service device (not shown), which may be connectable through a signal line (not shown).

If the mode is a normal one because of no application of the registration mode instruction signal from the external service device, the microcomputer 7 checks at step 120 whether an engine starting button (not shown) provided near a steering wheel is activated by the vehicle user. When the starting button is activated, the microcomputer 7 causes at step 130 the transponder circuit 19 and the transponder antenna 13 to generate the electromagnetic field of the first frequency f1 for accessing the transponder 35 in the portable device 3. The transponder 35 responsively transmits the transponder wave of the first frequency f1 including the engine starting verification ID code stored in its memory 35a. The transponder antenna 13 receives the transponder wave and the transponder circuit 19 outputs the ID code included in the transponder wave to the microcomputer 7.

The microcomputer 7 checks at step 140 whether the portable device 3 is an authorized one, by checking whether the ID code is received from the transponder 35 within a predetermined time after step 130 and is identical with the engine starting verification ID code stored in its memory 7a. If the portable device 3 is not an authorized one, the microcomputer 7 repeats steps 120 and 130. If the portable device 3 is an authorized one, the microcomputer 7 issues an engine starting permission signal to an engine start control device (not shown) to start the engine by a starter motor.

Thus, in the normal condition that the in-vehicle device 5, specifically the microcomputer 7, is not connected to the external service device, the vehicle user is enabled to start the engine by activating the start button while carrying the portable device 3. This is because the portable device 3 has the engine starting verification ID code in the memory 35a of the transponder 35, and this ID code has been registered in the in-vehicle device 5, that is, stored in the memory 7a of the microcomputer 7.

If the mode is determined to be the registration mode at step 110, on the other hand, the microcomputer 7 checks at step 160 whether the engine start button is activated. The engine start button is used to initiate additional key registration processing. If the start button is activated, the microcomputer 7 causes at step 170 the transponder circuit 19 and the antenna 13 to generate the electromagnetic field of the second frequency f2 thereby accessing the transponder 41 in the emergency key 37 accommodated in the device body 21.

The transponder 41 responsively transmits the transponder wave of the second frequency f2 including the key registration verification ID code stored in its memory 41a. The transponder antenna 13 receives the transponder wave and the transponder circuit 19 outputs the ID code included in the transponder wave to the microcomputer 7.

The microcomputer 7 checks at step 180 whether the ID code is received from the transponder 41 within a predetermined time after step 170 and is identical with the key registration verification ID code stored in its memory 7a. If the ID codes are not identical, the microcomputer 7 repeats steps 160 and 170. If the ID codes are identical, the microcomputer 7 starts a registration of an additional portable device at step 190.

This registration may be attained in the following manner. When a specified first switch (not shown) provided in the vehicle is activated, the microcomputer 7 causes the transmitter circuit 15 and the antenna 9 to transmit the request wave, so that the portable device 3 transmits the ID code wave from the antenna 29. The antenna 11 receives this ID code wave and the receiver circuit 17 outputs the ID code included in the ID code wave to the microcomputer 7. The microcomputer 7 registers this ID code in the memory 7a as a door lock/unlock verification ID code of the additional portable device.

When a specified second switch (not shown) provided in the vehicle is activated further, the microcomputer 7 causes the transponder circuit 19 and the antenna 13 to generate the electromagnetic field of the first frequency f1, so that the antenna 13 receives an ID code wave from the transponder 35 and the transponder circuit 19 outputs an ID code included in the ID code wave to the microcomputer 7. The microcomputer 7 then stores this ID code in its memory 7a as an engine start verification ID code of the additional portable device.

As described above, when an additional portable device is to be registered in the in-vehicle device 5, the external service device is connected to the in-vehicle device 5, specifically the microcomputer 7, to apply the registration mode instruction signal to the microcomputer 7. Then, the engine start button is activated to start the registration mode, while carrying the emergency key 37 in a condition accommodated in the device body 21 or separated from the device body 21. The additional portable device is brought in the first area outside the vehicle, and the first switch is activated. As a result, the ID code stored in the memory of the microcomputer of the additional portable device is registered by the microcomputer 7 of the in-vehicle device 5 and stored in the memory 7a as the door lock/unlock verification ID code of the additional portable device.

When the additional portable device to be registered is brought in the second area in the vehicle and the second switch is activated, the ID code stored in the transponder of the additional portable device is registered by the microcomputer 7 of the in-vehicle device 5 and stored in the memory as the engine start verification ID code of the additional portable device.

The above registration of additional portable devices is preferably made at car dealers. The original portable device 3, which has the emergency key 37 and has an additional portable device registration function, may be given as a set with a vehicle when sold.

In this embodiment, the emergency key 37 detachably accommodated in the device body 21 of the portable device 3 has the transponder 41, as the key registration verification ID code (second ID code) to identify an authorized user upon registration of the additional portable device. Since the emergency key 37 is a part of the portable device 3 and normally hand-held with the device body 21 as a unit, it will rarely be lost. Further, a vehicle user will not forget taking the emergency key 37 with him or her when he or she visits a car dealer for registering an additional portable device.

Figure 2B:
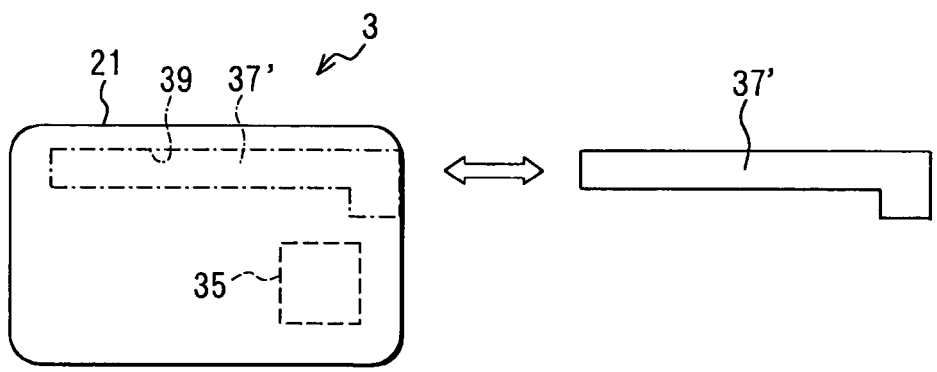
Figure 2C:
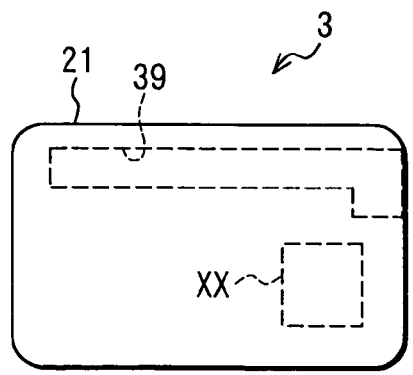

When a vehicle is rented to a third party as a rental car, a vehicle owner can allow the third person to use the vehicle with the portable device 3 to which the emergency key 37' having no transponder therein as shown in FIG. 2B. As a result, the third person who rented the vehicle is not allowed to register an additional portable device without permission of the vehicle owner. Further, the third person is allowed to manually lock or unlock doors and other parts of the vehicle manually by the emergency key 37', when the built-in battery 35 runs down.

When the vehicle is allowed to be driven temporarily by an employee of a hotel or a restaurant, only the device body 21 without emergency keys 37 or 37' may be handed over by removing the emergency keys 37 or 37' so that a vehicle trunk or an in-vehicle glove compartment may not be opened by the emergency key.

According to the embodiment, the ID code stored in the emergency key 37 is effective only when an additional portable device is registered. Specifically, the in-vehicle device 5 generates the electromagnetic field of the first frequency f1 so that only the transponder 35 embedded in the device body 21 may respond, when the microcomputer 7 checks whether the engine start control operation as a predetermined operation should be attained (NO at step 110 and YES at step 160). The in-vehicle device 5 generates the electromagnetic field of the second frequency f2 so that only the transponder 41 embedded in the emergency key 37 may respond, when the microcomputer 7 checks whether the ID code should be stored in the memory 7a (YES at step 110 and YES at step 160). Thus, only one of the transponders 35 and 41 is allowed to transmit the ID code depending on whether it is a case of verification of the engine start control or verification of the additional portable device registration.

The above embodiment may be modified in the following ways.

For instance, the portable device 3 may be provided with buttons for locking and unlocking doors. The buttons may be operated manually to transmit an electromagnetic wave including an ID code from the antenna 29 of the portable device 3 to the in-vehicle device 5 for locking or unlocking doors.

The ID code for verifying the additional portable device registration may be provided in the form of characters or numerals by engraving, attaching or printing on the emergency key 37 in place of the electronic transponder 41. These ID codes may be optically read by an optical scanner or visually recognized by an operator, and then input to the microcomputer 7 of the in-vehicle device 5 automatically or manually.

The ID code provided in the emergency key 37 is for use only at the registration of an additional portable device. Since this ID code is for verifying the authorized user, the same ID code may be used for verifying the authorized user when one of a plurality of electronic control units (ECUs), which communicate one another by using a ciphertext in a vehicle, is exchanged. Specifically, when one of such ECUs fails and needs replacement, a new ECU should also have the same ciphered information shared among the ECUs. That is, the ciphered information should also be registered in this new ECU as well. In this case, the ID code assigned to the emergency key 37 may be used to determine whether the registration of the ciphered information in the new ECU may be allowed.

In this instance, a vehicle user who rented a vehicle is restricted from exchanging an ECU without authority to break the security of ciphertext communication with other ECUs in a vehicle. Further, an authorized person such as a vehicle owner is enabled to replace a failing ECU with a new one by using the ID code of the emergency key 41, even when the authorized person does not carry an ID information which verifies an authorized user.

The present invention may further be modified in various ways without departing from the spirit of the invention. The present invention may also be implemented in houses or buildings other than a vehicle as an entry object.

What is claimed is:

1. An electronic entry system for an entry object comprising:
a portable device carried by a user and including a first memory storing first identification information thereof for verifying authorization of vehicle engine starting, and a first communication means provided within a device body for transmitting first identification information in response to a first request transmitted from outside, the first communication means being a first transponder; and
an in-object device for performing a predetermined operation when the first identification information transmitted from the portable device is identical with registered identification information stored in a memory,
wherein the portable device further includes an emergency key detachably accommodated and operable mechanically for entering the entry object, the emergency key including a second memory storing second identification information as registration information which is transmitted to the in-object device to indicate an authorized user at the time of registering a portable device, the second identification information being electronic identification information, and a second communication means for transmitting the second identification information in response to a second request from the in-object device, the second communication means being a second transponder,
wherein the in-object device includes a processor operably connected to a third communication means, the processor and third communication means being configured to transmit the first request to the portable device from the third communication means so that only the first communication means responds when determining whether the predetermined operation should be performed, and to transmit the second request to the portable device from the third communication means so that only the second communication means responds when determining whether a registration of identification information should be performed,
wherein the portable device further includes a first transmitter/receiver means, wherein the first transmitter/receiver means has another memory storing another information for verifying authorization of vehicle door locking/unlocking
wherein the third communication means includes a third transponder, and
wherein the third transponder transmits the first request at a first frequency and transmits the second request at a second frequency different from the first frequency.

2. The electronic entry system as in claim 1, wherein the first communication means and the second communication means are operable at different frequencies.

3. An electronic entry system for an entry object, comprising:
a portable device carried by a user and including a first memory storing first identification information thereof for verifying authorization of vehicle engine starting, and a first communication means provided within a device body for transmitting first identification information in response to a first request transmitted from outside, the first communication means being a first transponder; and
an in-object device for performing a predetermined operation when the first identification information transmitted from the portable device is identical with registered identification information stored in a memory,
wherein the portable device further includes an emergency key detachably accommodated and operable mechanically for entering the entry object, the emergency key including a second memory storing second identification information as registration information which is transmitted to the in-object device to indicate an authorized user at the time of registering a portable device, the second identification information being electronic identification information, and a second communication means for transmitting the second identification information in response to a second request from the in-object device, the second communication means being a second transponder, wherein the in-object device includes a processor operably connected to a third communication means, the processor and third communication means being configured to transmit the first request to the portable device from the third communication means so that only the first communication means responds when determining whether the predetermined operation should be performed, and to transmit the second request to the portable device from the third communication means so that only the second communication means responds when determining whether a registration of identification information should be performed, wherein the portable device further includes a first transmitter/receiver means, wherein the first transmitter/receiver means has another memory storing another information for verifying authorization of vehicle door locking/unlocking, wherein the third communication means receives both the first identification information for verifying authorization of vehicle engine starting and the second identification information, the second identification information being different from the first identification information.

4. The electronic entry system as in claim 3, an area of an electromagnetic field of the second frequency being narrower than an area of an electromagnetic field of the first frequency.

5. The electronic entry system as in claim 3, wherein the first communication means and the second communication means are operable at different frequencies.

6. An electronic entry system for an entry object comprising:
a portable device carried by a user and including a first memory storing first identification information thereof for verifying authorization of vehicle engine starting, and a first communication means provided within a device body for transmitting first identification information in response to a first request transmitted from outside, the first communication means being a first transponder; and
an in-object device for performing a predetermined operation when the first identification information transmitted from the portable device is identical with registered identification information stored in a memory, wherein the portable device further includes an emergency key detachably accommodated and operable mechanically for entering the entry object, the emergency key including a second memory storing second identification information as registration information which is transmitted to the in-object device to indicate an authorized user at the time of registering a portable device, the second identification information being electronic identification information, and a second communication means for transmitting the second identification information in response to a second request from the in-object device, the second communication means being a second transponder, wherein the in-object device includes a processor operably connected to a third communication means, the processor and third communication means being configured to transmit the first request to the portable device from the third communication means so that only the first communication means responds when determining whether the predetermined operation should be performed, and to transmit the second request to the portable device from the third communication means so that only the second communication means responds when determining whether a registration of identification information should be performed, wherein the portable device further includes a first transmitter/receiver means, wherein the first transmitter/receiver means has another memory storing another information for verifying authorization of vehicle door locking/unlocking, wherein the in-object device includes a second transmitter/receiver means operably connected to the processor, wherein the second transmitter/receiver means transmits a third request to the first transmitter/receiver means, wherein the first transmitter/receiver means transmits the another information in response to the third request, wherein the second transmitter/receiver means receives the another information, wherein the processor is configured to verify the another information and to authorize vehicle door locking/unlocking.

7. The electronic entry system as in claim 6, wherein the first communication means and the second communication means are operable at different frequencies.

* * * * *